Sept. 20, 1932.  L. B. GREEN  1,878,441
ORNAMENTING RING FOR SPOKED WHEELS
Filed March 28, 1931  2 Sheets-Sheet 1
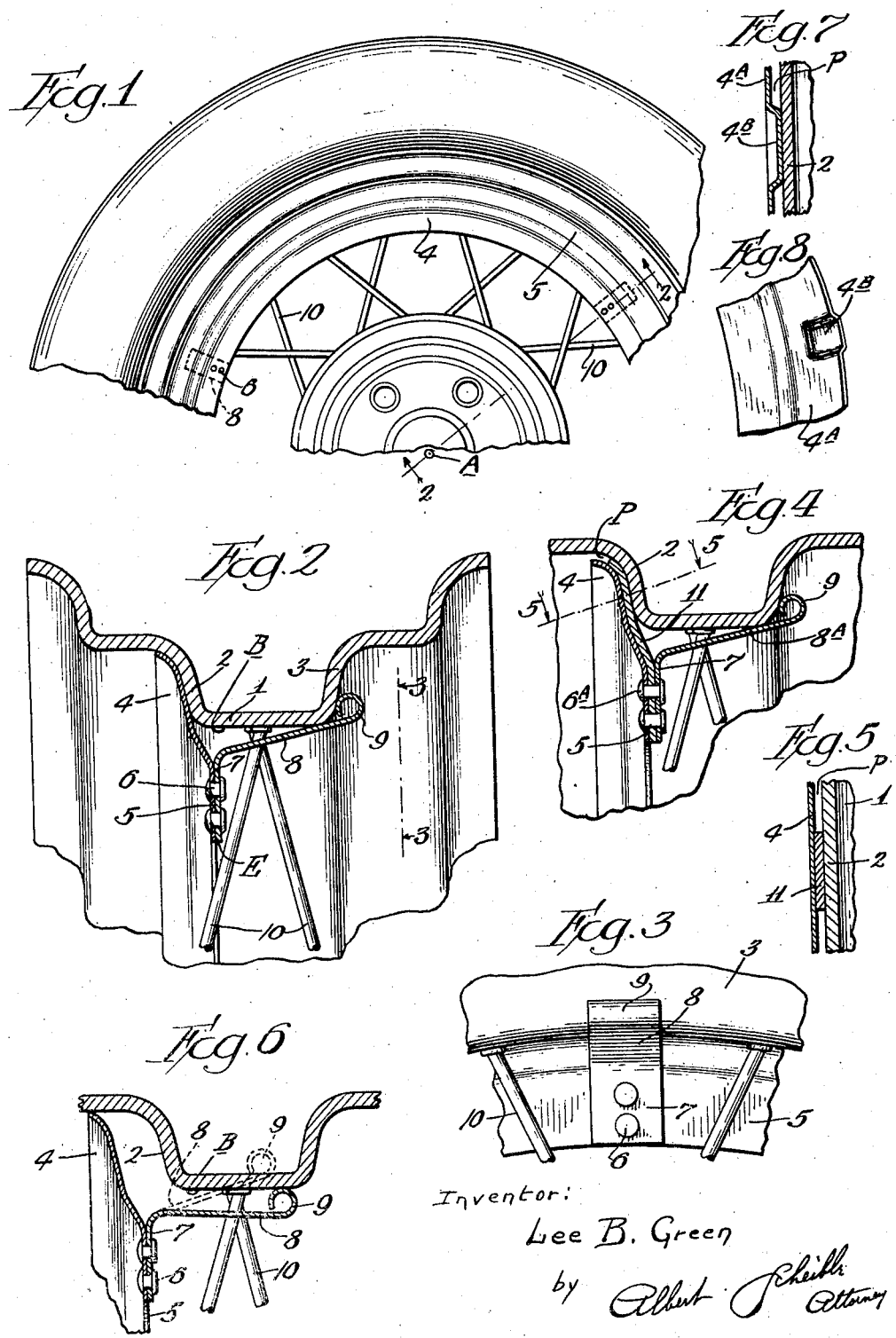
Inventor:
Lee B. Green Sept. 20, 1932.     L. B. GREEN     1,878,441
ORNAMENTING RING FOR SPOKED WHEELS
Filed March 28, 1931     2 Sheets-Sheet 2
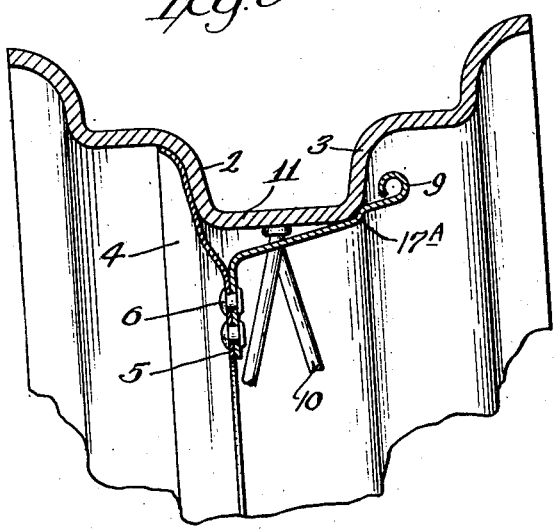
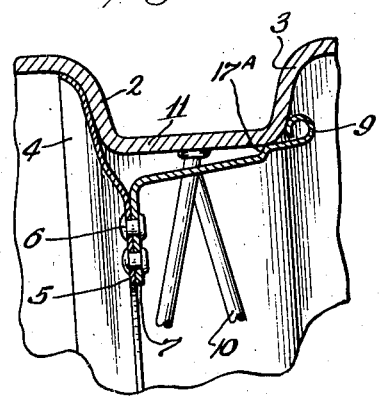
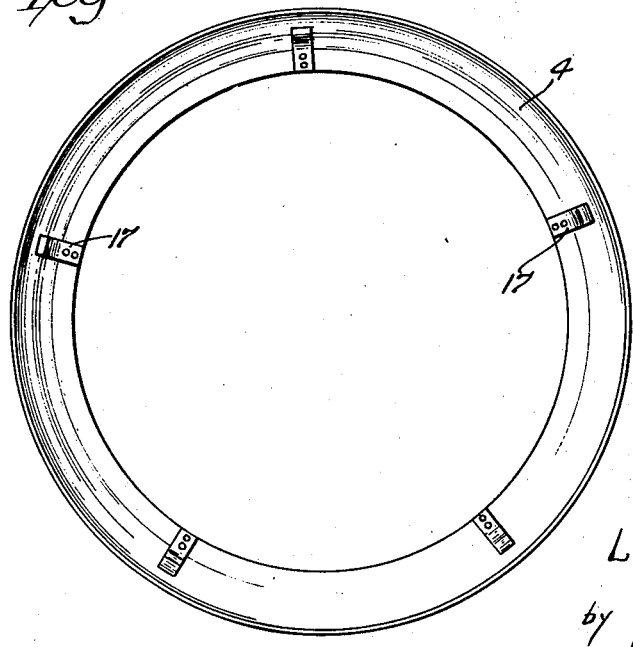
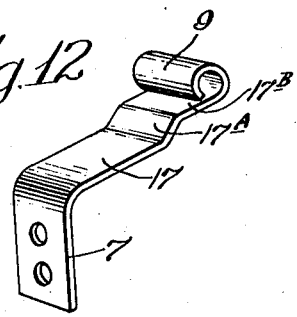
Inventor:
Lee B. Green Patented Sept. 20, 1932

1,878,441

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

ORNAMENTING RING FOR SPOKED WHEELS

Application filed March 28, 1931. Serial No. 525,984.

My invention relates to ornamental rings adapted to be attached to the rims of wheels for enhancing the appearance of the wheels.

In vehicle practice, and particularly in connection with the wheels of automobiles, it has long been customary to employ wire-spoked wheels largely because of the more ornamental appearance which the crossed (and usually plated) spokes give to the wheels, and it has also been customary to make the hub caps of decidedly ornamental appearance. However, even when both the wire spokes and the hub cap of a cushion wheel are nicely plated with nickel or chronium, the comparatively unfinished appearance of the wheel rim detracts from the general appearance, both because the relatively high cost of plating such a heavy wheel rim deters the manufacturers from finishing them in this manner, and also because such a rim (even if plated) is usually of a quite narrow width (radially of the wheel) in proportion to that of the pneumatic tire of the wheel.

These short comings in the appearance of an automobile wheel can be overcome by attaching to the outer face of the wheel a plated ring which will conceal the radially inner portion of the wheel rim and which will be of greater radially width than the still exposed portion of the wheel rim. For this purpose it has heretofore been proposed to secure such ornamenting rings to the spokes of the wheels by clips or the like, but such spoke-attached wheel rings have been found in practice to present these objections:

(1) The securing of the clips or other fastening means to the wire spokes must be done from the inner face of the wheel; and with the customary arrangements the attaching requires both a bending of the clips, an insertion of a cotter pin or other auxiliary fastening member in each clip, and a subsequent pinching of the clips and spreading apart of the stems of the cotter pin. All of this requires considerable time and labor, including the time required for jacking up the axle of the wheel, removing the hub cap and wheel for access to the inward face of the wheel, replacing the wheel and hub cap, and again lowering the axle.

(2) Since the number and relative directions of the wire spokes vary in wheels of different manufacture, even when these rims are of counterpart sizes and shapes, considerable difficulties are often encountered in attaching the fastening means to the spokes.

(3) Unless considerable care is used, spokes may be bent during the attaching of the fastening means.

(4) If any spoke to which an ornamenting ring is thus connected becomes bent, the attachment to this spoke is apt to be loosened so that rattling may result when the wheel rolls over rough ground.

My present invention aims to overcome all of these objections by providing ring-attaching means which will engage the rim of the wheel, which can be freely spaced at all times from the spokes of the wheel, and which require no auxiliary fastening elements. Furthermore, my invention aims to provide ring-attaching means which will effect a gripping of the wheel rim by their resiliency, which will also aid in centering the ring, and which permit the same ornamenting ring to be used with rims differing the lengths of their bore portions.

Moreover, my invention aims to provide an ornamenting ring which can easily be attached to the wheel without removing the wheel from the axle, which also can easily be detached to permit a complete and speedy cleaning of the spokes and the rim of the wheel, and which can be used to equal advantage both when the spokes are either radial of the wheel or at angles to radii of the wheel, and when the wheels have wood spokes.

Still further and also more detailed objects will appear from the following specification and from the accompanying drawings, in which drawings Fig. 1 is a fragmentary exterior elevation of a wire-spoked cushion wheel equipped with an ornamenting ring embodying my invention, with dotted lines showing the positions of two of the fastening members.

Fig. 2 is an enlarged radial section through the wheel rim, the ornamenting ring and one of the fastening members, taken along the line 2—2 of Fig. 1.

Fig. 3 is a fragmentary side elevation, taken from the line 3—3 of Fig. 2.

Fig. 4 is a section similar to portions of Fig. 2, showing another embodiment, namely one in which the radially outer portion of the ornamenting ring is spaced laterally from the wheel rim to permit water to flow between the ring and the rim during the washing of the wheel or in rainy weather.

Fig. 5 is a fragmentary section taken along the line 5—5 of Fig. 4.

Fig. 6 is a fragmentary section, taken radially of the wheel and the wheel rim of Figs. 1 and 2, showing how a ring-fastening member is flexed during the attaching or detaching of the ornamenting ring from the wheel ring.

Fig. 7 is a section similar to Fig. 5, showing a portion of the wheel ring as embossed inwardly to space the major portion of the ring laterally from the rim of the wheel, in substitution for the separately formed spacer member of Figs 4 and 5.

Fig. 8 is a perspective view of a portion of the wheel ring in Fig. 7.

Figs. 9 and 10 are sections similar to Fig. 2, showing the interchangeable use of attaching clips of a modified form for latching a wheel ornamenting ring to two rims having bore portions of different lengths.

Fig. 11 is a rear elevation of a wheel ornamenting ring equipped with shouldered attaching clips as shown in Figs. 9 and 10.

Fig. 12 is an enlarged perspective view of one of the shouldered attaching clips of Figs. 9 to 11.

Generally speaking, I accomplish the purposes of my invention by providing a wheel attachment consisting of a ring formed of sheet metal and having its inner and outer diameters respectively smaller and larger than the bore of the wheel rim to which the ring is to be attached, together with a plurality of resilient clips secured to this ring and adapted to engage the inner face of the rim so as to clamp the ring against the outer face of the said rim.

Illustrative of such a construction, Figs. 1, 2 and 3 show a wheel attachment designed to fit a non-demountable wheel rim, which rim has a medial tubular portion 1 connecting an outwardly facing annular face portion 2 with an inwardly facing annular portion 3, each of which annular rim portions extend at an oblique angle to the axis A of the rim.

Engaging the outwardly facing annular portion 2 of the rim, and desirably curved in radial section to fit the curvature of the outward face of this rim portion 2, is the radially outer portion 4 of a sheet metal ring which extends for a considerable distance towards the axis A of the wheel beyond the bore B of the medial tubular portion 1 of the rim, and which ring desirably includes as its radially inward part a flat annular portion 5.

Bearing against the inner face of this inner ring portion 5 and secured to the latter (as by rivets 6) are the supporting feet 7 of a plurality of resilient clips which are spaced circumferentially of the ring. Each of these clips desirably has its foot 7 extending radially of the ring, and also includes a rim-gripping arm 8 which extends at an obtuse angle to the supporting arm 7, the free end of the gripping arm 8 being rolled into a coil 9. The length of the foot 7 of each clip is preferably considerably shorter than the radial distance between the inner edge E of the ring and the bore B of the rim, so that this foot can be disposed entirely behind the ring while still leaving the juncture of the foot with the rim-gripping arm 8 spaced radially inward of the wheel from the bore of the rim, as in Fig. 2, and so that the flexing arm will slope at a sharply acute angle to the axis of the rim.

Moreover, each clip is initially formed with the gripping arm 8 disposed at a greater obtuse angle to the foot 7 than the angle between these parts when the ring is attached, so that the resiliency of the metal will continually urge each gripping arm 8 radially outward of the wheel and into engagement with the bore B of the rim. Also, the length of the gripping arm 8 and the diameter of the latching coil 9 are proportioned so that each coil 9 will engage the inwardly directed rim face portion 3 simultaneously with the said engagement of the rim bore B by the gripping arms 8.

With the parts thus formed and proportioned, each of the gripping arms 8 will extend at an enlarged obtuse angle to the supporting arm 7 of the same clip when my ornamenting ring is not in its attached position, as for example, at the angle indicated by dotted lines in Fig. 6. However, with the clips formed of a suitable thickness of metal, each flexing arm can be flexed manually toward the axis of the ring so as to permit the end coils 9 to be inserted simultaneously in the bore B of the medial tubular portion 1 of the rim. When the ring is then pressed manually laterally inward of the rim—or toward the right in Fig. 6—each clip-end coil 9 will slide along the bore B of the rim until this coil passes the laterally inner end of the said bore, whereupon the resiliency of the metal will flex the gripping arm 8 radially outward of the rim to the latching position shown in Fig. 2.

When my ornamenting attachment has thus been snapped on, the pressure of the gripping arms 8 against the bore of the rim will center the ring with respect to the rim, and the end coils 9 of the clips will act after the manner of hooks for drawing the ring laterally inward of the rim. In practice, I may form each clip-end coil 9 only to an incomplete turn, thereby permitting a flexing of this coil which will cooperate with the flexing of the clip arm 8 in drawing the radially outer portion 4 of the ring firmly against the adjacent outer rim face portion 2, and also in compensating for petty irregularities in the manufacture of the various parts.

Since my just described clip-carrying ring can easily be attached to the rim of the wheel from the outer face of the latter by merely initially flexing one or more of the clips and then sliding the entire attachment laterally inward of the wheel, no tools whatever are required for affixing such an ornamental attachment to the wheel, and the attaching can speedily be effected without removing the wheel from the axle. So, also, since suitably formed strips of resilient steel or the like suffice for the clips of my attachment, my entire wheel-ornamenting attachment can be assembled as a unit at the factory, and can also be suitably plated or otherwise finished as a unit before shipping it.

The width of my ornamenting ring as well as the radial cross-section of the ring may obviously be varied according to the general proportions of the wheel parts and the sectional configuration of the rim of the wheel, so long as the ring has portions adapted to seat firmly against a face portion of the rim and allows for an effective fastening of the clips to it. However, I preferably form the ring so that a portion of considerable width will bear against the wheel rim, thereby distributing the clamping pressure over such a large area of interengaged rim and ring parts as to prevent any rotational slipping of the rim on the ring even when the rotation of the wheel is suddenly halted. I also preferably form the clips so that the holding arm 8 will extend at a sharply acute angle to the bore B of the wheel rim, as shown for example in Fig. 2, thereby increasing the firmness of the latching of the ring to the wheel rim.

The number of resilient clips mounted on the wheel ring may obviously be varied, but these clips preferably are spaced substantially equally from one another. Thus, Fig. 1—which shows a fragment of an ornamenting ring with three clips—has the axes of the two illustrated clips at an angle of 120 degrees to each other.

Since the resilient latching members can be of quite small width in proportion to the circumferential length of the bore of the rim, the holding arm portions 8 of each of these members can readily extend freely between the outer end portions of adjacent spokes 10, so that the ring can readily be latched to the rim in many rotationally different positions, thereby expediting its attaching.

However, while I have heretofore described my invention in connection with an embodiment in which the radially outer portion of the ring bears flatwise against an outwardly directed annular face portion of the rim, I do not wish to be limited to the direct interengaging of the ring with the rim.

For example, Fig. 4 shows an embodiment in which a spacer strip 11 is interposed between the radially outer portion 4 of the ring and the side web 2 of the rim, this spacer being secured to the radially inner portion 5 of the ring by the same rivets 6 A which fasten the supporting arms 7 of the clips to the ring. The spacers thus interposed between the ring and the rim provide an intervening passage P between the ring and rim at all points between the consecutive spacers, through which water can freely flow during the washing of the car.

Figs. 7 and 8 show a modification of the ring-spacing arrangement of Fig. 4, namely the laterally inward embossing of outer edge portions 4 B of the ring, which embossed portions then space the rim web 2 from all of the parts 4 A of the ring which are disposed between the consecutive embossed portions.

With each of the illustrated embodiments, the attaching clips can be flexed out of their latching positions by reaching between the spokes from the exterior of the wheel, so that my ornamenting ring can readily be detached manually without removing the wheel from the axle, thereby facilitating a complete cleaning of the wheel.

Since both the ring and the latching means can readily be kept entirely out of contact with the spokes of the wheel and are not fastened in any manner to the spokes, I entirely avoid the heretofore encountered difficulties in locating numerous fastening means so that each thereof will effectively grip a spoke. I likewise avoid the frequent looseness of such fastenings, and eliminate all strains tending to bend the spokes. So also, my invention permits the same ring to be used with rims of a given size when the arrangement of the spokes is different, and permits the same latching members to be employed with rims of considerably varying sizes and sectional shapes, thereby further reducing the manufacturing costs.

Moreover, while I have heretofore described my invention in embodiment including numerous desirable details of construction and arrangement, and as applied to a single-piece type of wheel rim, I do not wish to be limited in these respects, since many changes could obviously be made without departing from the spirit of my invention or from the appended claims. Nor do I wish to be limited to the use of my invention in connection with wheels having wire spokes and metal rims, since my ring could obviously be formed to fit against a wooden felloe and since my latching members can extend with equal freedom between wooden spokes.

Where the rims of different wheels have bores of the same diameter but of differing lengths, I can also make my clip-carrying rings interchangeable for use on these wheel rims, by providing suitably disposed shoulder formations in the flexing clip arms, as shown in Figs. 9 to 12 inclusive.

For example, with the tubular bore portion 11 of the wheel rim of Fig. 10 is of the same interior diameter as the bore portion 1 of the wheel rim of Fig. 9, but with the tubular portion 11 longer than the corresponding tubular portion 1, I make the holding arm 17 of each attaching clip of such a length that the hook formation at its free end (here shown as a coil 9) will engage the laterally inward face of the inward rim flange 3, just as in Fig. 2. Then I form an offset in the clip arm 7, so as to afford a shoulder portion 17 A positioned for engaging the laterally inward face of the inner flange 3 on the narrower rim of Fig. 9, so that these shoulder portions will effect the latching of the ring to the rim on the narrower rims.

With such interchangeably effective clip arms, I preferably dispose the offsetting shoulder portion 17 A at such an angle between two parts of the arm 17 connected by this shoulder portion, namely the parts 17 and 17 B in Fig. 12, that a portion of the main arm part 17 adjacent to the said shoulder portion will press against the bore of the tubular portion 1 of the narrower rim when the shoulder portion effects the latching, while on the wider rims this bore will be engaged by the clip arm part 17 B adjacent to the latching coil 9, as in Fig. 10. Thus arranged, the clip members of my wheel ring serve equally well on rims of two different widths for aiding in a centering of the ring with respect to the wheel rim.

I claim as my invention:

1. Means for ornamenting a wheel rim, comprising a sheet metal ring bearing for a portion of its width flatwise against the outwardly directed lateral face of the rim; and a plurality of spaced resilient clips each composed of a metal strip having one end portion secured flatwise to the ring and having its other end portion composed of a coil having its axis parallel to a flat face of the strip and radially outward of the bore of the rim and having a peripheral portion of the coil in hooking engagement with the inwardly directed face of the rim.

2. Means for clamping an ornamenting ring against one face of a wheel rim, comprising relatively spaced flat strips of metal each having its end portions respectively coiled flatwise and bent flatwise, the said coiling and bending being in respectively opposite directions; and instrumentalities for securing the flatwise bent end portions of the strips to the ring; each strip having the part between its said end portions of such a length that the coiled end portion of the strip will press against the inward face of the wheel rim when the ring bears against the outward face of the rim.

3. Ring clamping means as per claim 2, in which each strip has the part between its said end portions provided with an offset presenting a shoulder facing laterally outward of the wheel and adapted to press against the inward face of a relatively narrower rim when the same ring bears against the outward face of such a relatively narrower rim.

4. An ornamenting attachment for a wheel rim, comprising a ring having its radially outward portion overlying an outwardly directed lateral face portion of the rim and having a bore smaller than the bore of the rim; and plural resilient attaching members each having one end portion thereof engaging the inward face of the radially inner portion of the ring and the other end portion thereof engaging the inward face of the rim, the part of each attaching member interposed between its said end portions extending within the bore of the rim and comprising two portions of which the laterally inward one is offset radially outward of the ring from the other one.

5. For use with a wheel which includes a rim having a laterally outward annular face portion of concave section radially of the rim: an ornamenting attachment comprising a ring member having circumferentially spaced portions thereof conforming in radial section to and engaging the said rim face portion, so as to center the ring with respect to the rim; and single-piece resilient attaching members each comprising a laterally outward end portion secured to the ring, a laterally inward end portion engaging the inward face of the rim, and a medial portion extending within the bore of the rim; the medial portion of each attaching member being adapted to be flexed with respect to the said outward end portion of that member toward the axis of the rim for releasing the engagement of the laterally inward portion of that member with the rim.

6. Resilient clips for releasably clamping an ornamenting ring against the laterally outward face of either of two wheel rims having inner bore portions of different lengths, comprising resilient strips each secured at its laterally outer end to the ring and having its laterally inward end portion disposed for engaging the laterally inward face of the wider rim; each clip having intermediate of its length a bend bowed radially outward with respect to the ring and presenting a laterally outwardly directed shoulder face, the effective spacing of this shoulder face from the rim-engaging inward end portion of the strip corresponding to the difference in the length of the said bore portions of the two wheel rims.

7. Resilient clips for releasably clamping an ornamenting ring against the laterally outward face of either of two wheels having bore portions of equal diameter but different lengths; comprising resilient strips each secured at its outer end to the ring and having its main portion extending from the ring through the bore of the rim, the said main portion of each strip having adjacent to its laterally inward end two shoulder portions spaced longitudinally of the said bore and both facing the ring.

8. An ornamenting attachment for a wheel rim, comprising a ring member including an annular part overlying an annular outwardly directed lateral face portion of the rim and disposed with the ring member engaging the said rim face portion at a plurality of circumferentially spaced points; and plural resilent attaching members each including in integral formation a foot portion secured to the ring member, an arm extending longitudinally of the bore of the rim within the said bore, and a latch portion engaging the inwardly directed lateral face of the rim.

9. An ornamenting attachment for a wheel rim, comprising a ring member including an annular part adjacent to an outwardly directed lateral face of the rim, the ring member having circumferentially spaced portions thereof bearing against the said face of the rim and having other portions thereof freely spaced from the said rim face; and plural resilient attaching members extending within the bore of the rim, each of the said members having one end portion thereof secured to the ring member and the other end portion thereof hookingly engaging the laterally inward face of the rim.

10. Means for ornamenting a wheel rim, as per claim 1, in which the medial portion of each clip extends at a sharply acute angle to the axis of the ring.

11. A wheel ornamenting attachment as per claim 1, in which the said medial part of each attaching member normally engages the bore of the rim so as to cooperate with the said centering of the ring for preventing movement of the ring with respect to the rim.

12. Means for ornamenting a wheel which includes a rim and relatively spaced spokes, comprising a sheet metal ring bearing for a portion of its width flatwise against the outwardly directed lateral face of the rim; and a plurality of separately formed resilient clips mounted on the said ring and each having an end portion thereof extending beyond and engaging the inwardly directed face of the rim so as to clamp the ring against the rim, the said clips being spaced so that each thereof can be freely inserted between two consecutive spokes of the wheel.

13. Means for ornamenting a wheel which includes a rim and relatively spaced spokes, comprising a sheet metal ring bearing for a portion of its width flatwise against the outwardly directed lateral face of the rim, the bore of the ring being smaller than that of the wheel rim; and a plurality of separately formed and relatively spaced resilient clips mounted on the said ring and each including a foot portion extending radially of the ring along the inner face of the ring and secured to the portion of the ring which is within a continuation of the bore of the rim, a medial portion extending from the radially outer end of the foot portion within the bore of the rim, and a latching portion extending radially outward of the rim from the laterally inward end of the said medial portion and engaging the inwardly directed face of the rim; the said clips being spaced so that each thereof can be freely inserted between two consecutive spokes of the wheel.

Signed at Cleveland, Ohio, March 25, 1931.

LEE B. GREEN.